3,419,006
NOVEL DRESSING AND USE THEREOF

Paul A. King, Warwick, N.Y., assignor to Union Carbide Corporation, a corporation of New York
No Drawing. Filed Aug. 8, 1966, Ser. No. 570,773
21 Claims. (Cl. 128—268)

This invention relates to a novel dressing and to a process for its use. In one aspect this invention relates to a novel, sterile, transparent dressing, useful in the treatment of burns and other accidental injuries to the skin and eyes. In a further aspect, the dressings of this invention are also useful for treating surgical incisions, abrasions, cautery burns and also as an aid in the treatment of a variety of dermatological skin disorders.

A wide variety of products are currently available on the market in the field of wound dressings. For example, sterile and medicated gauze-type dressings are widely employed in hospitals after major surgery and also in the home for minor accidental injuries. However, in spite of their wide acceptance, the gauze-type dressings are not without their disadvantages. For instance, frequent changes of such dressings are necessary in order to observe that the healing process is proceeding as desired. Additionally, the frequent changes are accompanied by discomfort to the patient since some adherence to the wound or wound exudate normally occurs. The gauze-type dressings also require removal to renew medication. Moreover, the gauze-type dressings do not render the wound free of extraneous bacteria and viruses, nor do they control the proper moisture balance.

More recently, various polymeric materials have been investigated for use in the treatment of wounds, burns and other skin disorders. For example, collagen, polyvinyl alcohol, gelatin and wide variety of polymeric materials have been disclosed in the literature as being useful in the treatment of accidental and surgical wounds. However, in most instances these materials are neither transparent, nor do they control the growth of bacteria. Moreover, many patients have been found to be allergic to these dressings which necessitates a return to the use of the gauze-type product.

It is therefore an object of this invention to provide a novel dressing. Another object of this invention is to provide a wound dressing which overcomes the disadvantages associated with the gauze-type and polymeric dressings. A further object is to provide a wound dressing which is particularly useful in the treatment of burns. Another object of this invention is to provide a dressing which is useful in the treatment of accidental injuries and surgery to the skin and eyes, and in a variety of dermatological applications. A still further object of this invention is to provide a novel wound dressing having one or more medicaments and/or additives incorporated therein. A further object of this invention is to provide a novel wound dressing which is a barrier to bacteria and viruses but is permeable to vapors and gases, while being impermeable to fluids. Another object is to provide a novel dressing that can act as both a water supplier or absorber to the injured area. Another object is to provide a process for the use of the aforementioned novel dressings. These and other objects will readily become apparent to those skilled in the art in the light in the teachings herein set forth.

In its broad aspect, this invention relates to a novel, sterile, transparent dressing and to a process for its use. The novel dressings of this invention are comprised of a hydrophilic, polymeric gel of at least one insoluble polymer of the formula:

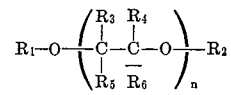

wherein $R_1$ and $R_2$ are selected from the group consisting of hydrogen, alkyl radicals and alkyl substituted aryl radicals, and wherein $R_3$ is hydrogen when $R_4$ is selected from the group consisting of hydrogen, methyl, phenyl and vinyl radicals, $R_4$ is hydrogen when $R_3$ is selected from the group consisting of hydrogen, methyl, phenyl and vinyl radicals, $R_5$ is hydrogen when $R_6$ is selected from the group consisting of hydrogen, methyl, phenyl and vinyl radicals, and $R_6$ is hydrogen when $R_5$ is selected from the group consisting of hydrogen, methyl, phenyl and vinyl radicals, and $n$ is greater than one.

Dressings prepared in accordance with the teachings of this invention possess many desirable advantages not available in products currently on the market. It has been reported in the literature by Dr. P. Clarkson, Wound Healing, Pergamon Press, 1961, that there are four basic functions for a dressing. First the dressing should provide protection from physical trauma; it should provide protection from infection by preventing exposure to air; it should prevent maceration; and finally it should maintain medicinal agents in contact with the wound. Additional advantages are present in the novel dressings of this invention. Moreover, the dressings of this invention are characterized by a combination of other desirable features not heretofore found in a single dressing. For example, the dressings of this invention are transparent permitting observation of the affected area, water vapor and gas permeable but fluid impermeable, easily sterilized, can have chemotherapeutic agents and other medicaments and additives incorporated therein, easily removed from the skin, have a high thermal exchange with consequent decreased pain, as for example in burns, act as both a water supplier or absorber, are a barrier to bacteria and viruses, and other desirable properties.

As hereinbefore indicated, the hydrophilic gels employed in this invention are polymeric compounds containing at least one of the structural units shown below:

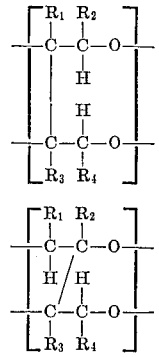

wherein $R_1$ is hydrogen when $R_2$ is selected from the group consisting of hydrogen, methyl, phenyl and vinyl radicals; $R_2$ is hydrogen when $R_1$ is selected from the group consisting of hydrogen, methyl, phenyl and vinyl radicals; $R_3$ is hydrogen when $R_4$ is selected from the group consisting of hydrogen, methyl, phenyl and vinyl radicals; and wherein $R_4$ is hydrogen when $R_3$ is selected from the group consisting of hydrogen, methyl, phenyl and vinyl radicals.

These hydrophilic polymeric gel compounds may include carbon to carbon crosslinking between straight chain carbon atoms and the carbon atoms of branch chain methyl groups and between the carbon atoms of branch chain methyl groups themselves. In addition a very minor and insignificant number of bonds may include two oxygen atoms linking the carbon atoms.

The polymeric gel compounds may contain crosslinking bonds present as inter-molecular bonds (e.g. between two different molecules) and intramolecular bonds (e.g. between carbon atoms of the same molecule), and combinations of intra and inter-molecular crosslinking bonds.

The term "crosslinking" is utilized herein to define the process whereby a new carbon to carbon bond is formed in an organic polymer. The bond may link two carbon atoms of two different polymers or may link two carbon atoms of the same polymer.

In a preferred aspect, the process for producing the polymeric gel compounds comprises preparing a homogeneous water solution of at least one of the water soluble compounds selected from the following class of compounds:

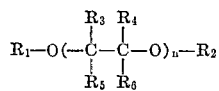

wherein $R_1$ and $R_2$ are selected from the group consisting of hydrogen, alkyl radicals and alkyl substituted aryl radicals, $R_3$ is hydrogen when $R_4$ is selected from the group consisting of hydrogen, methyl, phenyl and vinyl radicals, $R_4$ is hydrogen when $R_3$ is selected from the group consisting of hydrogen, methyl, phenyl and vinyl radicals, $R_5$ is hydrogen when $R_6$ is selected from the group consisting of hydrogen, methyl, phenyl and vinyl radicals, $R_6$ is hydrogen when $R_5$ is selected from the group consisting of hydrogen, methyl, phenyl and vinyl radicals, and $n$ is greater than one; submitting the solution to ionizing radiation for a period of time sufficient to cause a change in viscosity of the solution; removing the water from the solution and recovering the residue. The residue contains polymers having the hereinbefore described crosslinking bonds.

Ionizing radiation has been defined as comprising the alpha and beta species of particles which possess a level of energy sufficient to remove orbital electrons from atoms by passing in close proximity to the atoms. The alpha and beta species of particles cause direct ionization of atoms.

Gamma rays and X-rays do not consist of particles and carry no electrical charge but their passage through matter results in indirect ionization by causing the ejection of electron from atoms. These secondary electrons in turn produce ionization in a manner similar to beta particles.

For the specific purpose of describing the present invention the phrase "ionizing radiation" will be utilized to include alpha, beta particles, X-rays and gamma rays and electrons from Van de Graff and other high voltage accelerators.

The starting solution upon irradiation generally exhibits an initial decrease in viscosity. As irradiation continues the increases in viscosity through the viscosity level of the starting solution and upon continued irradiation a macro molecular gel-like material is formed.

The hydrogen atoms and hydroxyl radicals formed through the interaction of ionizing radiation with water are capable of reacting with certain types of organic compounds. One common reaction is the abstraction of a hydrogen atom by the water radicals to give either $H_2O$ or $H_2$ and a substituted carbon radical. Two of these carbon radicals can combine to form a new carbon to carbon bond or crosslink.

The initial decrease in viscosity may be due to a combination of crosslinking and degradation or to crosslinking which changes the shape of the molecule to cause a smaller swept volume. The viscosity begins to rise after the number of crosslinked molecules is substantially increased.

Continued irradiation eventually causes the formation of a sufficient number of carbon to carbon crosslinking bonds to result in the transformation of the solution into an insoluble gel-like material. The matrix of the gel-like material consists of starting polymers which have been intra and/or inter-molecularly crosslinked in the structural manner shown above and to a sufficient extent to form a macro molecular material. The water is reversibly held in the interstices of the resulting high molecular weight material. In addition, the crosslinked matrix may contain entwined starting polymers which are not crosslinked but which are so entwined with the crosslinked matrix that they remain substantially insoluble.

The water may be removed from the matrix by various processes, including simple evaporation processes, to produce a tough elastic material which will reversibly pick up large amounts of water upon contact therewith by sorption. Water removal and pickup by the matrix can be carried on reversibly any desired number of times.

Polymeric starting materials amenable for use in the present invention are those compositions containing ether linkages. They include (1) copolymers of ethylene oxide with propylene oxide, butylene oxide and styrene oxide in all combinations and containing either hydrogen, alkyl or alkyl substituted end groups wherein the percentage of ethylene oxide polymer in the copolymer ranges from about 50 to 75 percent, (2) copolymer of polypropylene glycol, polyethylene glycol, ethylene oxide polymers ranging in molecular weight from about 200 to about $10 \times 10^7$ and (3) alkyl substituted phenyl ethers of ethylene oxide polymers, alkyl and dialkyl ethers of polyethylene glycol.

It is preferred that the water starting solutions be void of scavenging agents. The term "scavenging agents" denotes those species which react with the reactive agent produced by the irradiation of water and/or those species which react with the organic radicals formed during the present process. While very pure water is the preferred solvent for the starting solution, the presence of small amounts of scavenging agents is not detrimental to the operability of the present process since they will react during the early part of the irradiation period and are eventually expended leaving the desired crosslinking reaction to proceed uninhibited. Oxygen is an example of a scavenger which will react with hydrogen atoms and/or organic radicals. After a short period of time the oxygen is expended and carbon to carbon crosslinking can occur uninhibited.

The pH of the solution apparently is not critical to the operability of the preparation of the polymeric gels although the time required to cause formation of the gel-like material can be considerably shortened by utilizing a starting solution having a pH of about 7.0.

Temperature apparently is not critical to the operability of the process since the gel-like material has been formed in solutions having a temperature of just above the freezing point up to the boiling point of the starting solution.

Three inter-related process variables which should be taken into account in preparing the polymeric gels are dosage, concentration of the starting polymeric solute and the molecular weight of the starting polymeric solute.

Dosage (e.g. energy absorption) will be described herein in terms of rads. A rad corresponds to an energy of absorption of 100 ergs/gram of material treated.

Increasing concentrations of the starting solute in the starting solution generally lead to lower dosage requirements to cause formation of the gel-like material. Increasing the molecular weight of the starting solute generally has an analogous effect on the dosage required to cause formation of the gel-like material.

It has been found that if irradiation is continued in any given process to the extent that the solution is transformed into a gel-like material, the final gel-like material will contain progressively larger amounts of water if the concentration of the starting solute is progressively decreased.

A more extended discussion of the use of the polymers of ethylene oxide as starting solutes in the present invention to produce compounds containing the herein disclosed crosslinking bonds may aid in further understanding the invention.

In the treatment of polymers of ethylene oxide in accordance with the present process it is preferred to utilize poly(ethylene oxide) having a molecular weight ranging from about $1 \times 10^5$ to about $10^8$; a starting water solution containing at least about 0.2 weight per cent of poly(ethylene oxide); and submitting the starting solution to a total irradiation dosage of at least about $52.0 \times 10^4$ rads to produce the gel-like material.

Table I is a tabulation of the results obtained by irradiating polymers of ethylene oxide of various molecular weights under varying conditions, as noted, to produce a final gel-like material.

TABLE I

| | Molecular weight | Con., wt. percent | Atmosphere | Type of radiation | Dosage in rads | Wt. percent $H_2O$ in the gel-like material | Viscosity in centipoises |
|---|---|---|---|---|---|---|---|
| 1 | $3.0 \times 10^6$ | 2 | Air | X-ray | | 98 | Gel. |
| 2 | $3.0 \times 10^6$ | 2.6 | $N_2$ | X-ray | $0.1 \times 10^6$ | 97.4 | Gel. |
| 3 | $3.0 \times 10^6$ | 2.6 | $N_2$ | X-ray | $2 \times 10^6$ | 98 | Gel. |
| 4 | $3.0 \times 10^6$ | 2.0 | Air | $\gamma$ | $1.6 \times 10^6$ | 98 | Gel. |
| 5 | $3.0 \times 10^6$ | 2.0 | Air | $\gamma$ | $6.3 \times 10^5$ | | Brittle gel. |
| 6 | $3.0 \times 10^6$ | 2.5 | Air | $\gamma$ | $1.9 \times 10^6$ | 96.5 | Gel. |
| 7 | $3.0 \times 10^6$ | 2.0 | Air | $\gamma$ | $0.5 \times 10^6$ | 97.7 | Gel. |
| 8 | $3.0 \times 10^6$ | 0.5 | Air | X-ray | $0.3 \times 10^6$ | 99 | Gel. |
| 9 | $3.0 \times 10^5$ | 3.0 | Air | X-ray | $1 \times 10^6$ | 98 | Gel. |
| 10 | $3.0 \times 10^5$–$3.0 \times 10^6$ | 0.5 | Air | X-ray | $3 \times 10^6$ | 99 | Gel. |
| 11 | $3.0 \times 10^6$ | 2.0 | Air | e– | 0.67 | 98 | Gel. |

The gel-like material produced by the present process utilizing ethylene oxide polymers as a starting solute can be dried to remove the water therefrom. Upon drying the gel-like material gradually shrinks and eventually becomes a tough elastic material exhibiting at most a light color. The water-free matrix is insoluble in water and several organic liquids including methanol, benzyl alcohol, formic acid, acrylic acid, benzene, nitrobenzene, chlorobenzene, m-cresol, o-nitro-toluene, pyridine, morpholine, chloroform, 2-nitropropane and dioxane.

The following tables show the decrease in viscosity exhibited by starting solutions of poly(ethylene oxide) after initial irradiation treatment with the subsequent increase in viscosity and eventually the formation of a gel-like material.

Table II correlates the dosage and viscosity of a homogeneous water solution containing 0.1 weight percent poly(ethylene oxide) of an initial molecular weight of approximately $3 \times 10^6$. The solution was irradiated with gamma rays under a nitrogen atmosphere. Viscosity measurements were made by the falling ball technique with a Hoeppler viscometer at 20° C., after dilution of the irradiated sample from 1.0 to 0.1 weight percent concentration.

TABLE II

| Dose in rads $\times 10^4$: | Viscosity in centipoise |
|---|---|
| 0.0 | 2.97 |
| 1.3 | 1.42 |
| 1.9 | 1.33 |
| 3.0 | 1.35 |
| 3.17 | 1.40 |
| 4.9 | 1.48 |
| 11 | Gel-like |

Table III correlates the dosage and viscosity of a homogeneous water solution containing 0.2 weight percent poly(ethylene oxide) of approximately an initial molecular weight of $3 \times 10^5$. The solution was irradiated with gamma rays in atmosphere of air. Viscosity measurements were made by the falling ball technique with a Hoeppler viscometer at 30° C. after dilution of the irradiated sample from a 2.0 to 0.2 weight percent concentration.

TABLE III

| Dose in rads $\times 10^4$: | Viscosity in centipoise |
|---|---|
| 0.0 | 1.16 |
| 2.38 | 1.03 |
| 7.59 | 0.94 |
| 12.5 | 0.96 |
| 49.6 | 0.93 |
| 22.2 | 1.12 |
| 62.6 | Gel-like |

To further illustrate the scope of the present invention a copolymer composed of approximately 75 weight percent ethylene oxide and 25 weight percent propylene oxide in a homogeneous solution with water was irradiated with gamma rays for a period of time sufficient to cause formation of a gel-like material. The total dosage was approximately $15.6 \times 10^6$ rads.

In general, after the hydrophilic polymeric gels have been prepared, they can be used directly after sterilization as wound dressings or preferably further modified by the addition of a polymeric backing or the incorporation of various chemotherapeutic agents, medicaments, or other additives, as hereinafter indicated.

In one embodiment of this invention the hydrophilic, polymeric compounds which are employed in the wound dressing can contain a backing of a second polymeric material which provides strength to the dressing and aids in the control of water evaporation and permeation of gases. In practice, a wide variety of materials have been found suitable for use as backings for the wound dressing. For example, polyvinylidene chloride, polyethylene, polypropylene, polyethylene teraphthalate, polyamides, polyvinyl chloride, cellulose acetate and derivatives thereof, polydimethylbutadiene, polyurethanes, polyvinylalcohol, silicone rubbers polyacrylic acid and the like.

The hydrophilic gel material can be attached to the backing compound by a variety of methods. For example, the gel can be grafted to the backing by irradiation during the crosslinking step. Additionally, the gel can be attached to the backing by adhesives, surface tension, or by the incorporation into the gel of monomers such as acrylonitrile, butadiene monoxide, and the like, and then grafting the polymeric material to the backing by irradiation. It is preferred that the backing likewise be transparent in order that the healing process can be observed without the removal of the dressing. Additionally, the particular backing material chosen should possess the necessary degree of permeability to allow for water evaporation and to control the permeation of gases. In those instances where the backing material is not permeable, it can be perforated prior to attachment to the hydrophilic gel.

In addition to the use of a polymeric material as a backing for the dressings of this invention, the dressing itself can contain various strengthening materials throughout. For example, nylon gauze, rayon mesh, Dacron or cellulose mesh can be embedded in the hydrophilic gel, fibers can be embedded in a random orientation, or the gel itself can be incorporated into a polyurethane foam, honeycomb structure or other material.

In addition to the polymeric material which provides strength and aids in control of water evaporation and permeation of gases, an additional polymeric film, not tightly bonded to the gel, can be used to protect and maintain sterility of the gel surface which will ultimately be in contact with the skin or wound. This protective layer can be easily removed just prior to use. Illustrative polymeric materials which can be employed as a removable protective layer include: polyethylene, polypropylene, polyvinyl chloride, cellophane, and the like.

In practice, the previously mentioned crosslinking step employed in the preparation of the polymeric gels can be accomplished prior to, or simultaneously with the attachment of the backing polymeric material, or the incorporation of an internal matrix or strengthening agent. Crosslinking can be effected on the poly(ethylene oxide) component alone by exposure of the aqueous solution to radiation. If an internal matrix is desired, it can be incorporated by the fusion of two layers of the hydrophilic gel over the matrix after crosslinking, or by dipping the matrix prior to crosslinking into the aqueous poly(ethylene oxide) solution and then exposing it to irradiation.

The novel dressings of this invention can be made in a variety of thicknesses ranging from about 1 millimeter or less, to several inches, or more. However, it has been observed that excellent results can be obtained in the treatment of wounds and burns with dressings having thicknesses of from about 5 to about 15 millimeters.

Due to the permeability and biological inertness of the hydrophilic gels, the novel dressings of this invention are particularly suited for the incorporation therein of a wide variety of chemotherapeutic agents, medicinal agents and additives. For instance, the dressings can contain topical anesthetics such as butesin picrate, xylocane (lidocaine hydrochloride), metycane hydrochloride (piperocaine hydrochloride) and the like; bacteriostatic agents such as silver nitrate (0.5 percent solution), sulfa drugs, for example mafenid (10 percent suspension of p-aminomethylbenzene sulfonamide in a water dispersible cream), zephiran (benzalkonium chloride), polylysine and the like; antibiotics such as bacitracin, neomycin, aureomycin, tetracycline, penicillin, polymysin streptomycin, signemycin, erythroyomycin, oleandomycin, and the like; topical steriods, such as neodecadron, cortisporin and the like; enzymes such as biozyme, elase, baridase and the like; topical tissue stimulants, such as, chloresion; coagulants and anticoagulants; anti-fungal agents, such as acrisorcin (hexylresorcinol salt of 9-aminoacridine), bactine, isopropanol, merthiolate (thimerosal), nystatin, and the like.

Other additives which may not necessarily be chemotherapeutic agents can also be incorporated into the dressing. For example, emollients such as the lower molecular weight glycols, Carbowaxes and the like, can be added to the hydrophilic gel prior to, or after the cross-linking step.

The quantity of the aforementioned medicinal agents, chemotherapeutic agents or additives which can be incorporated into the dressings will of course be dependent upon the particular agent, its solubility, and the presence of other additives. In general, however, the agents will be employed in a therapeutic amount. This can range from about, 0.0001 percent and lower, upwards to about 40 precent and higher by weight. A unique feature of the hydrophilic polymeric gels is that additional or different chemotherapeutic agents or medicaments can be added to the dressing while in place and transported to the site of the wound by diffusion through the gel. Hence, it is possible either by incorporating agents directly into the gel before use, or applying to the gel while protecting the injured area, to provide a controlled release of medication.

The novel wound dressings of this invention can be conveniently sterilized by known techniques, preferably in the absence of oxygen and under 100 percent relative humidity. For instance, the dressing can be sterilized in an autoclave, by irradiation, or other techniques. In many instances, sterilization if effected simultaneously with the cross-linking steps.

As hereinbefore indicated the hydrophilic polymeric gels employed in this invention possess a combination of properties which render them particularly unique for use as dressings. The gels are pliable, have a cushioning effect and easily adapt to the contour of the injured area.

An additional feature of the hydrophilic gels of this invention, is their ability to adsorb large quantities of liquids with minimum changes in dimensional stability. In normal applications and depending upon the method of preparation the gels can adsorb up to twice their weight of water. This is of particular advantage in the treatment of burns and incisions in that exuded matter formed during the healing process can be absorbed and diffused away from the site of the wound.

In practice, the amount of water in the hydrophilic gel can vary between 0 and 99.9 percent depending upon the concentration of the solution before irradiation, the number of cross-links and the amount of water removed after the cross-linking step. Preferably the polymer content should be between 1 and 20 weight percent and more preferably between 2 and 6 weight percent.

A further unique feature of the dressings of this invention, is the ability to maintain a sterile, isotonic environment for the wound. Due to the hydrophilic feature of the gels large quantities of isotonic solutions can be adsorbed into the dressing. For instance, gels which have been saturated with a physiological saline solution (0.9 percent salt by weight) are particularly useful in burn therapy.

When the previously mentioned chemotherapeutic agents, medicaments and additives are employed, they can be incorporated into the hydrophilic gel by a variety of techniques. For example, if the particular agent is uneffected by the cross-linking process it can be incorporated into the solution of the polymer prior to irradiation. Alternatively, the agents can be adsorbed into the hydrophilic gel after the cross-linking and drying steps, or mechanically added to the gel by a variety of techniques.

Toxicity studies were conducted on guinea pigs to determine the effect of the polymeric hydrophilic gel. Five grams of poly(ethylene oxide) per kilogram of body weight were administered both by interperitoneal and sub-cutaneous injections to two groups of 5 pigs each.

At the end of a 14 day period, observations indicated that there were no adverse effects. Upon sacrifice of three of the 5 guinea pigs which received the hydrophilic gel by interperitoneal injection gross observations indicated that the material was dispersed throughout the peritoneal cavity, more heavily concentrated at the site of injection and on the omentum. Similarly, at the end of the 14 day period, gross observations of three sacrificed pigs which received the gel by sub-cutaneous injection, indicated that the material remained at the site of the injection and had become walled off through the body's defense mechanism to a foreign object. Histopathological studies on the vital organs from the sacrificed animals indicated no evidence of adverse effect to the animal.

The poly(ethylene oxide) employed was coagulant grade, blend No. 3718 supplied by the Chemicals Division of Union Carbide Corporation. A two weight percent solution was irradiated according to the previously described technique until the viscosity had decreased markedly but no gel had formed. Enough additional poly(ethylene oxide) was added to bring the concentration to 4 weight percent. A nylon mesh, without polypropylene backing, coated with this 4 percent solution was then exposed to irradiation and the desired hydrophilic gel obtained.

Thereafter the backing was removed and the gel mechanically scraped off the nylon mesh. 117.6 grams of this material was placed in a Waring Blendor and 117.0 grams of water added. Both constituents were blended at a high speed for a short time. The preparation was blown through with nitrogen and autoclaved for 15 minutes at 20 pounds pressure and 260° F.

The outstanding advantages of the novel dressings of this invention on injuries was confirmed by their use in the treatment of burns and incisions as set forth in the following examples:

Example I

A preliminary study was carried out to determine the effects of the hydrophilic gels dressing on denuded skin, open incisions, sutured incisions and cautery burns. The guinea pig was selected as the experimental animal because of the suppleness and tenderness of its skin.

Fifteen adult albino guinea pigs (Hartly strain) were divided into five groups on the following bases:

Group I:
  Right side—sutured incision covered with the hydrophilic gel bandage.
  Left side—no incision, hydrophilic gel bandage only.
Group II:
  Right side—sutured incision covered with the hydrophilic gel bandage.
  Left side—sutured; no covering.
Group III:
  Right side—cautery burn covered with the hydrophilic gel bandage.
  Left side—cautery burn covered with gauze Band-Aid.
Group IV:
  Right side—incision, no suture, covered with the hydrophilic gel bandage.
  Left side—incision, no suture, covered with gauze Band-Aid.
Group V:
  Right side—cautery burn covered with the hydrophilic gel bandage.
  Left side—cautery burn covered with gauze Band-Aid.

In the first four groups the hydrophilic polymeric gel used was a 4 weight percent irradiated poly (ethylene oxide) solution (coagulant grade, blend No. 3718 supplied by the Chemicals Division of Union Carbide). A nylon mesh was imbedded in the gel with a 0.25 mil Mylar film served as a backing. The dressing was autoclaved in a beaker of water. In the last group (Group V) similar dressings were prepared and autoclaved in a petri dish sealed in a plastic bag and autoclaved. The autoclaved dressings were handled with aseptic techniques. All preparations and surgical procedures were carried out under aseptic conditions using aseptic techniques.

Group I: (A) A guinea pig (280 g.), denuded of hair on its dorsal surface by means of a clippers and use of a dipilatory, was anesthetized by ether inhalation. An incision, approximately 20 mm. long was made on the right side of the spinal column through the skin layer, but not through the musculature beneath. The incision was sutured with one suture of black surgical silk #4/0 and the sutured incision was covered with a square of the hydrophilic gel dressing approximately 25 x 25 mm. which was secured with sutures around its edges. The left side was not incised and sutured but a similar square of the hydrophilic gel dressing was secured in the same way.
(B) A guinea pig (286 g.) was prepared, incised, anesthetized and sutured in the same manner as Pig A, however, the hydrophilic gel dressing on both sides were covered with ¼ mil Mylar film and the Mylar film was adhered to the skin by means of a benzene base adhesive.
(C) A guinea pig (325 g.) was prepared, anesthetized, incised and sutured in the same manner as Pig B and the hydrophilic gel dressings were attached in the same way.

Group II: (A) A guinea pig (300 g.) died during ether anesthesia.
(B) A guinea pig (300 g.) was prepared, anesthetized and incised in similar manner as Pig B, Group I, except that incisions were made and sutured on both sides of the spinal column. The right side was bandaged in the same manner as Pig B, Group I, but the left side was left exposed to air.
(C) A guinea pig (270 g.) was prepared, anesthetized, incised, sutured and bandaged in the same manner as Pig B, Group II, except that saran was used to cover the dressed incision rather than ¼ mil Mylar film.

Group III: (A) A guinea pig (285 g.) was prepared in the same manner as Pig A, Group I. The animal was anesthetized with 35 mg./kg. of sodium pentobarbital (IP) and a burn made by a cautery needle applied to the area (5 mm.) for approximately 20 seconds, was inflicted to the skin on either side of the spinal column. The burn on the right side was bandaged in the same manner as Pig C, Group II, using saran. The burn on the left side was covered with a gauze Band-Aid.
(B) A guinea pig (260 g.) was prepared, anesthetized, burned and bandaged in the same manner as Pig A, Group III.
(C) A guinea pig (260 g.) was prepared, anesthetized, burned, bandaged in the same manner as Pig A, Group III.

Group IV: (A) A guinea pig (250 g.) was prepared and anesthetized in the same manner as Pig A, Group III. The animal was incised and bandaged in the same manner as Pig C, Group II with the exception of the fact that these incisions were not sutured.
(B) A guinea pig (255 g.) was prepared, anesthetized, incised and bandaged in the same manner as Pig A, Group IV.
(C) A guinea pig (273 g.) was prepared, anesthetized, incised and bandaged in the same manner as Pig A, Group IV, except that both incisions were made on the left side with the hydrophilic gel dressing being the more posterior; this was done because of the skin irritation seen on the right side of the spinal column.

Group V: Three guinea pigs, A, B, C (330 g., 275 g., and 300 g.) were prepared, anesthetized, burned and bandaged in exactly the same manner as Group III, however, in this group the second type of gel dressing described above was used.

The following observations were noted on the guinea pigs:

Group I: The dressings were still intact on all three animals and there appeared to be no irritation from the gel on Day 1. On Day 2, the dressing had dried out on Pig A but dressings were still intact on Pigs B and C with no apparent irritation. Pig B was healing well; the dressing was still intact but the gel was dry; on Pig C the dressing was still intact, and the gel was somewhat moist. The Mylar covered bandage stayed on for about five days before it loosened and fell off. There seemed to be no apparent irritation from the gel dressing on either the sutured incision or on the unincised skin.

Group II: The dressing on Pig B was intact, however on Pig C, it had begun to come off on Day 1. On Day 2, the gel side of both animals seemed to be healing better without irritation and inflammation; the dressing on Pig B was still intact, the dressing on Pig C had come off completely. On Day 3, the dressing had come off Pig B, but the gel side of both animals seemed to be healing at a more rapid rate. The progress continued throughout the testing period.

Group III: All dressings had come off on Day 1 and all three pigs were rebandaged. All gel covered burns were moist and soft and all gauze covered burns showed the formation of a hard, crusty covering on the area. The dressing remained on Pig B for three days and the healing of all three animals closely paralleled the results seen on Day 1. The gauze covered burns felt thicker to the touch and were hard and dry. The gel covered burns were not so thick and were moist and pliable.

Group IV: The dressings were intact on Day 1 and healing could be observed through the gel bandages. On Day 2, the dressings were still intact; the gel covered wound had closed and the gauze covered wounds were still open with scabs forming. On Day 3, there was a marked difference to the naked eye in the healing progress. The gel dressed wounds were closed with no scab formation and only slight scar tissue, while the gauze covered wounds were still open at the edges with considerable dry scab areas. Even after six days when the scabs of the gauze dressings were sloughed off, the gel dressed wounds were quite advanced in healing.

Group V: The results were very similar to Group III. On Day 2, two of the dressings had come off and the third were still intact but had dried out completely. The condition of the burns paralleled that of Group III.

It was evident from the aforementioned tests that the hydrophilic polymeric gel of this invention were markedly superior to the commonly used gauze-type dressings.

Although the invention has been illustrated by the foregoing examples, it is not to be construed as being limited to the materials employed therein, but rather the invention encompasses the generic area as hereinbefore disclosed. Various modifications and embodiments of this invention can be had without departing from the spirit and scope thereof.

What is claimed is:

1. A novel transparent dressing comprised of a layer of a hydrophilic polymeric gel, said gel being comprised of at least one crosslinked polymer of the formula:

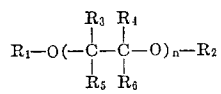

wherein $R_1$ and $R_2$ are selected from the group consisting of hydrogen, alkyl radicals and alkyl substituted aryl radicals, and wherein $R_3$ is hydrogen when $R_4$ is selected from the group consisting of hydrogen, methyl, phenyl and vinyl radicals, $R_4$ is hydrogen when $R_3$ is selected from the group consisting of hydrogen, methyl, phenyl and vinyl radicals, $R_5$ is hydrogen when $R_6$ is selected from the group consisting of hydrogen, methyl, phenyl and vinyl radicals, and $R_6$ is hydrogen when $R_5$ is selected from the group consisting of hydrogen, methyl, phenyl and vinyl radicals, and $n$ is greater than one.

2. The dressing of claim 1 wherein said dressing is sterile.

3. The dressing of claim 1 wherein one surface of said hydrophilic polymeric gel is supported by a gas and vapor permeable backing.

4. The dressing of claim 1 wherein said hydrophilic polymeric gel has internally incorporated therein a gas and vapor permeable supporting structure.

5. The dressing of claim 1 wherein one surface of said hydrophilic polymeric gel is supported by a gas and vapor permeable polymeric backing and said other surface is covered with a removable protective film.

6. The dressing of claim 1 wherein said hydrophilic polymeric gel has incorporated therein at least one chemotherapeutic agent.

7. The dressing of claim 1 wherein said hydrophilic polymeric gel has adsorbed therein a physiological saline solution.

8. The dressing of claim 1 wherein said hydrophilic polymeric gel is cross-linked poly(ethylene oxide).

9. The dressing of claim 8 wherein one surface of said cross-linked poly(ethylene oxide) is supported by a gas and vapor permeable backing.

10. The dressing of claim 8 wherein said cross-linked poly(ethylene oxide) has internally incorporated therein a gas and vapor permeable supporting structure.

11. The dressing of claim 8 wherein one surface of said cross-linked poly(ethylene oxide) is supported by a gas and vapor permeable backing and the other surface is covered with a removable protective film.

12. The dressing of claim 8 wherein said cross-linked poly(ethylene oxide) has incorporated therein at least one chemotherapeutic agent.

13. The dressing of claim 8 wherein said cross-linked poly(ethylene oxide) has adsorbed therein a physiological saline solution.

14. A sterile, transparent dressing comprising, in combination, a layer of cross-linked poly(ethylene oxide), one surface of said poly(ethylene oxide) supported by a transparent, gas and vapor permeable backing, said other surface covered with a removable protective film, and said poly(ethylene oxide) having adsorbed therein at least one member selected from the group consisting of chemotherapeutic agents, physiological saline solution, and medicaments.

15. A process for the treatment of accidental and surgical injuries to the skin and eyes which comprises applying to the injured area the novel dressing of claim 2.

16. A process for the treatment of burns, wounds and skin disorders which comprises applying to the burned area the novel dressing of claim 2.

17. A process for the treatment of burns, wounds and skin disorders which comprises applying to the burned area the novel dressing of claim 6.

18. A process for the treatment of burns, wounds and skin disorders which comprises applying to the burned area the novel dressing of claim 7.

19. A process for the treatment of burns, wounds and skin disorders which comprises applying to the burned area the novel dressing of claim 12.

20. A process for the treatment of burns, wounds and skin disorders which comprises applying to the burned area the novel dressing of claim 13.

21. A process for the treatment of burns, wounds and skin disorders which comprises applying to the burned area the novel dressing of claim 14.

References Cited

UNITED STATES PATENTS

| | | | |
|---|---|---|---|
| 2,794,010 | 5/1957 | Jackson | 117—140 |
| 3,287,222 | 11/1966 | Larde et al. | 167—84 |
| 3,297,032 | 1/1967 | Antonik | 128—268 |

ADELE M. EAGER, Primary Examiner.

U.S. Cl. X.R.

117—140; 128—156; 167—84